United States Patent [19]

Webster et al.

[11] Patent Number: 4,519,188
[45] Date of Patent: May 28, 1985

[54] LINKAGE FOR EQUALIZING CONDITIONING ROLL PRESSURE

[75] Inventors: Emmett G. Webster; Kenneth W. McLean, both of New Holland, Pa.

[73] Assignee: Sperry Corporation, New Holland, Pa.

[21] Appl. No.: 585,673

[22] Filed: Mar. 2, 1984

[51] Int. Cl.³ .............................................. A01D 82/00
[52] U.S. Cl. ................................ 56/16.4; 56/DIG. 1; 100/169; 241/230
[58] Field of Search ....................... 56/14.1, 13.6, 192, 56/DIG. 1, 16.4; 100/168, 169, 171; 241/230, 232, 234

[56] References Cited

U.S. PATENT DOCUMENTS

| | | | |
|---|---|---|---|
| 2,737,130 | 3/1956 | Rhodes | 100/171 |
| 2,932,143 | 4/1960 | Morkowski | 56/DIG. 1 |
| 3,489,079 | 1/1970 | Aurich et al. | 100/168 |
| 4,040,344 | 8/1977 | Moore et al. | 100/171 |
| 4,127,981 | 12/1978 | Parrish et al. | 56/14.4 |

FOREIGN PATENT DOCUMENTS 38778 10/1960 U.S.S.R. ......................... 56/DIG. 1

Primary Examiner—John J. Wilson
Assistant Examiner—John G. Weiss
Attorney, Agent, or Firm—Larry W. Miller; Frank A. Seemar; Darrell F. Marquette

[57] ABSTRACT

A linkage for equalizing the biasing forces exerted on the opposing transverse ends of the upper conditioning roll in a mower-conditioner is disclosed wherein a separate torsion bar is utilized to bias each respective end of the upper conditioning roll toward the lower conditioning roll, each torsion bar being connected to a biasing force equalization member for equalizing the pressure exerted on the opposing transverse ends of the upper conditioning roll. The equalization member includes a pair of arms interconnected by a trunnion to permit a limited relative movement between the two arms to accommodate differences in manufacturing tolerances in the torsion bars. An adjustment crank is connected to the trunnion to effect a selective simultaneous movement of the arms to vary the roll pressure.

10 Claims, 4 Drawing Figures

LINKAGE FOR EQUALIZING CONDITIONING ROLL PRESSURE

BACKGROUND OF THE INVENTION

The present invention relates generally to hay harvesting machines, commonly referred to as mower-conditioners, and, more particularly, to improvements in the biasing mechanism for urging the upper conditioning roll toward a position relative to the lower conditioning roll.

Mower-conditioners have been provided for the harvesting of hay for a number of years. A mower-conditioner severs standing crop material and conveys the severed crop material rearwardly into a conditioning mechanism without depositing the severed crop upon the ground. The conditioning mechanism has undertaken many forms; however, a preferred embodiment utilizes a pair of generally vertically disposed intermeshing rubber rolls to crimp and/or crush severed crop material passing therebetween. To permit the passage of a variable amount of crop material between the conditioning rolls, the upper conditioning roll is pivotally mounted for movement toward and away from the lower conditioning roll. A biasing mechanism is generally provided to urge the upper conditioning roll toward a position relative to the lower conditioning roll.

One embodiment of a biasing mechanism utilizes torsion bars to provide a biasing force to the structure pivotally mounting the ends of the upper conditioning roll. Each torsion bar is provided with a hexagonal cross-section at each end; however, manufacturing variances make it difficult to manufacture each torsion bar so that all four hexagonal cross-sectioned ends can be aligned without preloading pressure to one end of the roll. Presently, to attain equalized pressure exerted on each end of the upper conditioning roll, the flats of all four hexagonal cross-sections would have to be properly aligned. Because of these manufacturing variances and the assembly of the torsion bars in current pressure adjustment mechanisms, as well as other component variances, one torsion bar will often become displaced more than the other, resulting in unequal pressure being exerted on the transverse ends of the upper conditioning roll and, therefore, uneven conditioning of the crop material.

SUMMARY OF THE INVENTION

It is an object of this invention to overcome the aforementioned disadvantages of the prior art by providing a linkage interconnecting the torsion bars to permit an equalization of the pressure exerted on opposing ends of the upper conditioning rolls.

It is another object of this invention to provide a biasing force equalization mechanism having first and second arms interconnected by a trunnion to permit a limited relative movement between the first and second arms.

It is a feature of this invention that the biasing force exerted on the opposing transverse ends of the upper conditioning roll are equalized.

It is an advantage of this invention that the conditioning mechanism will more evenly condition crop material received thereby.

It is still another object of this invention to provide an adjustment mechanism connected to the trunnion to affect an adjustment of the biasing force exerted on the upper conditioning roll.

It is another feature of this invention that adjustment to both ends of the upper conditioning roll can be adjusted through manipulation of a single adjustment member.

It is still another feature of this invention that the adjustment mechanism includes a crank member having an internally threaded leg and an adjustment member pivotally connected to the trunnion and threadably received within the crank member leg.

It is another advantage of this invention that variances in the manufacturing of torsion bars will not adversely affect the conditioning of crop material in a mower-conditioner.

It is still another advantage of this invention that the threads on the adjusting member are protected from crop residue by being positioned inside of the crank arm leg.

It is a further feature of this invention that the use of rubber sleeves to protect the threads of the adjusting rod can be eliminated.

It is an advantage of this invention that the hexagonal ends of the torsion bars do not have to be aligned to create an equal windup in the torsion bars.

It is still another object of this invention to provide a biasing force equalizing mechanism to equalize the pressure exerted on the opposing transverse ends of the upper conditioning roll in a mower-conditioner that is durable in construction, inexpensive of manufacture, carefree of maintenance, facile in assemblage and simple and effective in use.

These and other objects, features, and advantages are accomplished according to the instant invention by providing a linkage for equalizing the biasing forces exerted on the opposing transverse ends of the upper conditioning roll in a mower-conditioner wherein a separate torsion bar is utilized to bias each respective end of the upper conditioning roll toward the lower conditioning roll, each torsion bar being connected to a biasing force equalization member for equalizing the pressure exerted on the opposing transverse ends of the upper conditioning roll. The equalization member includes a pair of arms interconnected by a trunnion to permit a limited relative movement between the two arms to accommodate differences in manufacturng tolerances in the torsion bars. An adjustment crank is connected to the trunnion to effect a selective simultaneous movement of the arms to vary the roll pressure.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
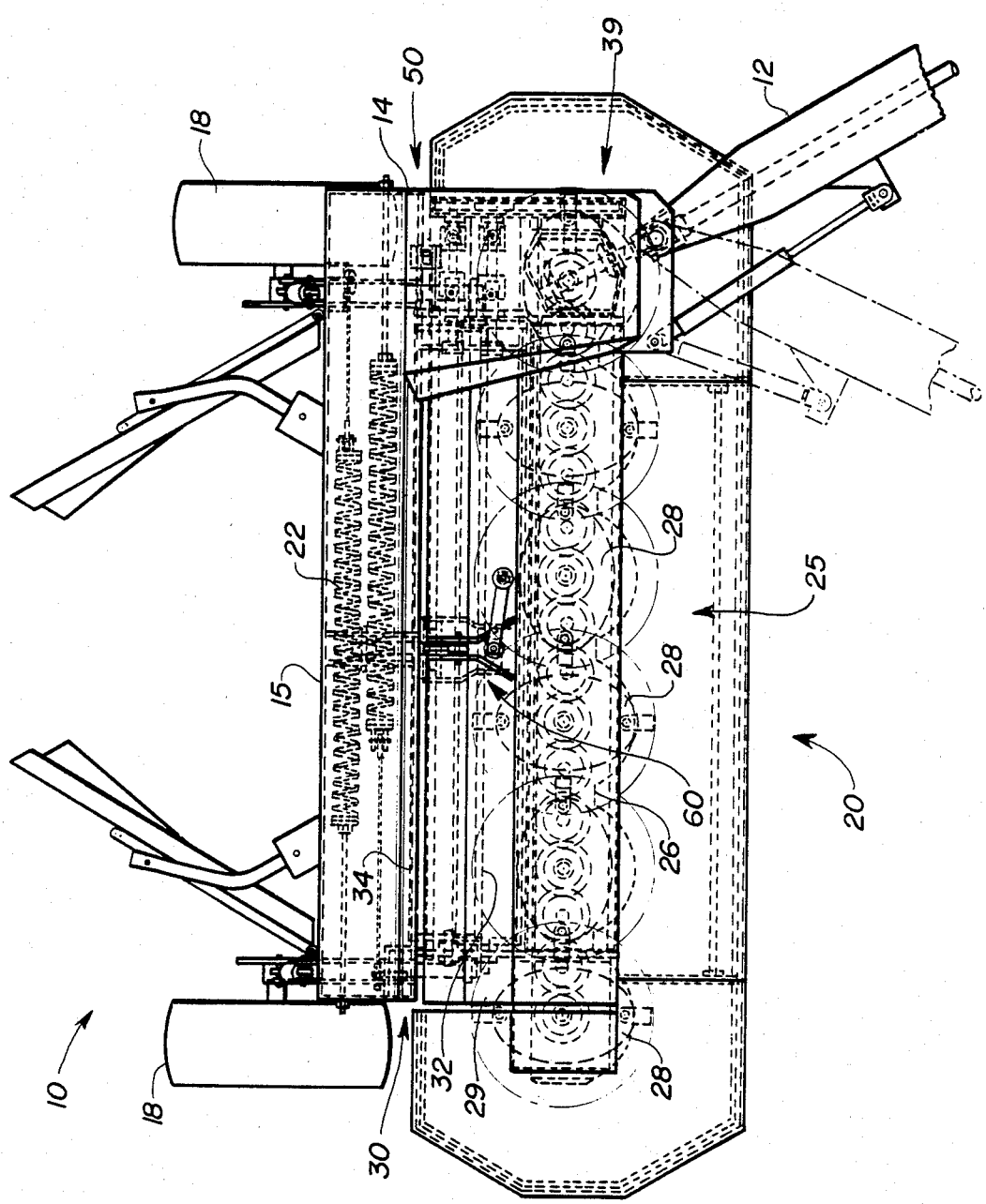
FIG. 1 is a top plan view of a disc mower-conditioner incorporating the principles of the instant invention, a portion of the draft member being broken away.

Referring now to the drawings, and particularly to FIG. 1, a top plan of a hay harvesting machine, commonly referred to as the disc mower-conditioner, can be seen. Any left and right references are used as a matter of convenience and are determined by standing at the rear of the mower-conditioner, facing the forward end, the direction of travel. The mower-conditioner 10 is shown in the form of a pull-type machine having a draft member 12 pivotally connected to the frame 14 of the machine 10. Frame 14 includes a main transverse support beam 15 to which are connected downwardly depending legs 17 mounting wheels 18 for mobilely supporting the machine 10 over the ground G, as best seen in FIG. 2.

Figure 2:
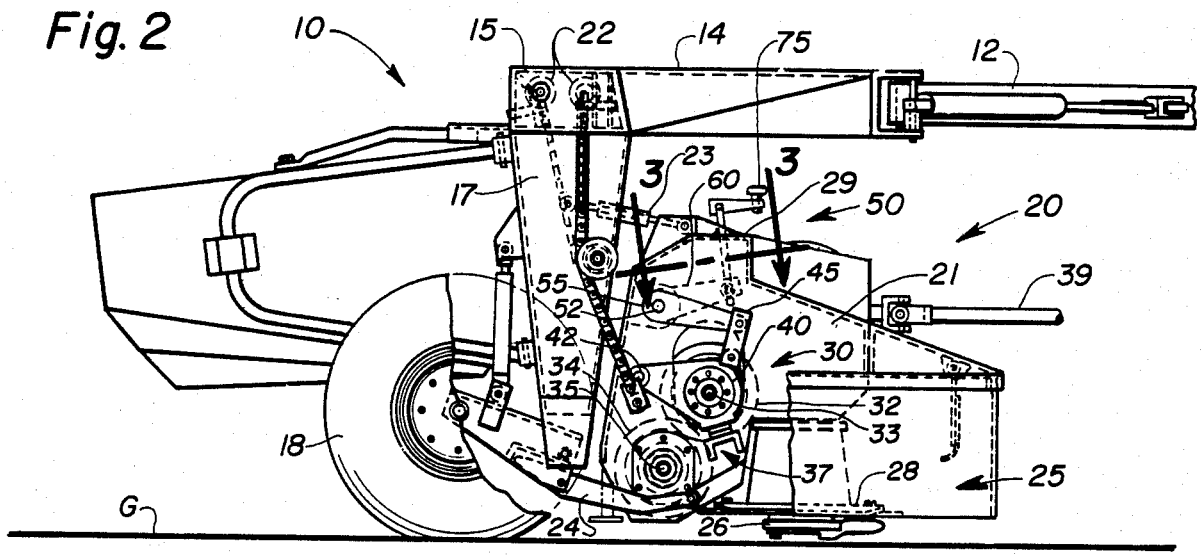
FIG. 2 is a side elevational view of the disc mower-conditioner seen in FIG. 1 with portions being broken away to better show the invention.

Referring to FIGS. 1 and 2, the mower-conditioner 10 includes a crop harvesting header 20 floatingly supported for movement with the ground G relative to the frame 14 by the counterbalancing mechanism 22 and upper and lower links 23,24 interconnecting the header 20 in the frame 14. The header 20 is provided with a crop cutting mechanism 25, seen in the form of a disc cutterbar 26, such as a Kuhn three meter, six rotor rotary cutterbar, having a plurality of transversely spaced disc cutter members 28 operable to sever standing crop material by impact action. A conditioning mechanism 30 is mounted in the header 20 rearwardly of the cutting mechanism 25 to receive and condition crop material severed by the cutterbar 26.

The conditioning mechanism 30 includes a pair of cooperable, generally vertically spaced transverse conditioning rolls 32,34 operable to condition severed crop material passing therebetween. Each roll 32,34 is rotatably mounted such that the axis of rotation 33 of the upper conditioning roll 32 is spaced slightly forwardly of the axis of rotation 35 of the lower conditioning roll 34, so that the nip 37 formed therebetween is facing slightly downwardly toward the disc cutterbar 26. The preferred embodiment of the conditioning roll construction shown in FIGS. 1 and 2, is of the intermeshing lug design. Rotational power is provided to the conditioning mechanism 30 and the cutting mechanism 25 by a conventional drive mechanism 39.

Figure 3:
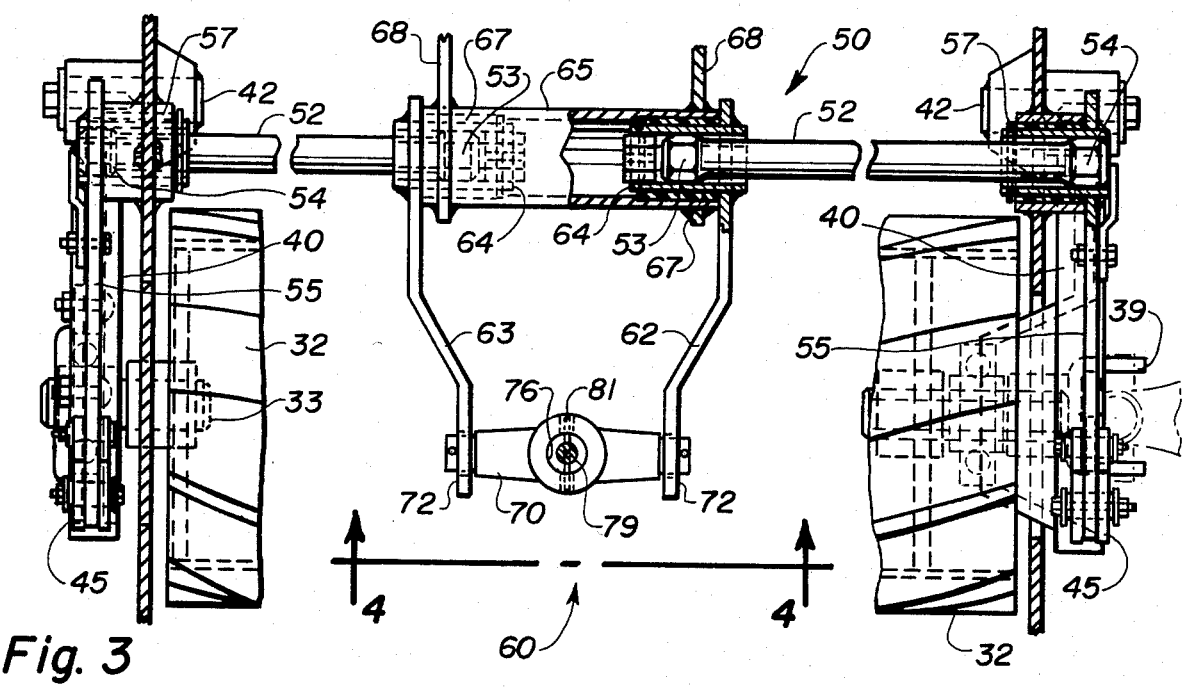
FIG. 3 is a partial cross-sectional view taken along lines 3—3 of FIG. 2 and showing the upper roll biasing mechanism, parts of the torsion bars being broken away to better show the invention and portions of the biasing force equalization mechanism being broken away to better show the details of the construction.

Referring now to FIGS. 1, 2 and 3, the lower conditioning roll 34 is mounted in the header 20 in a stationary position. The upper roll 32 is rotatably mounted in pivot arms 40 pivotally connected by a pivot 42 mounted on the opposing side sheets 21 of the header 20. Accordingly, the upper roll 32 is capable of generally vertical movement about the pivot 42 relative to the lower roll 34 to accommodate variable amounts of crop material passing between the rolls 32,34. The pivot arms 40 are connected to a biasing mechanism 50 by links 45 at each side sheet of the header 20.

The biasing mechanism 50 includes a pair of transversely disposed torsion bars 52 having transversely spaced, hexagonally cross-sectioned inboard and outboard ends 53,54, respectively. The outboard ends 54 of the torsion bars 52 are connected to torsion arms 55 disposed outboard of the respective side sheets 21 of the header 20, each torsion arm 55 being connected to the respective pivot arm 40 by the corresponding link 45.

The torsion bars 52 are rotatably supported within the side sheets 21 by bushings 57 adjacent the outboard ends 54.

The inboard ends 53 of the torsion bars 52 are interconnected by a a biasing force equalization mechanism 60 having left and right arms 62,63 connected to the respective inboard ends 53 of the torsion bars 52 for movement therewith. Each arm 62,63 is affixed to a sleeve 64 rotatably received within a tubular member 65 by bushings 67. The tubular member 65 is affixed to the header 20 by means of the support flanges 68 so that the position of the tubular member 65 is fixed relative to the header 20. As is best seen in FIG. 3, the inboard ends 53 of the torsion bars 52 are received within the tubular member 65 and, therefore, are positionally fixed relative to the header 20. However, as is discussed in further detail below, the inboard ends 53 are rotatable to vary the biasing pressure exerted on the upper conditioning roll 32.

Figure 4:
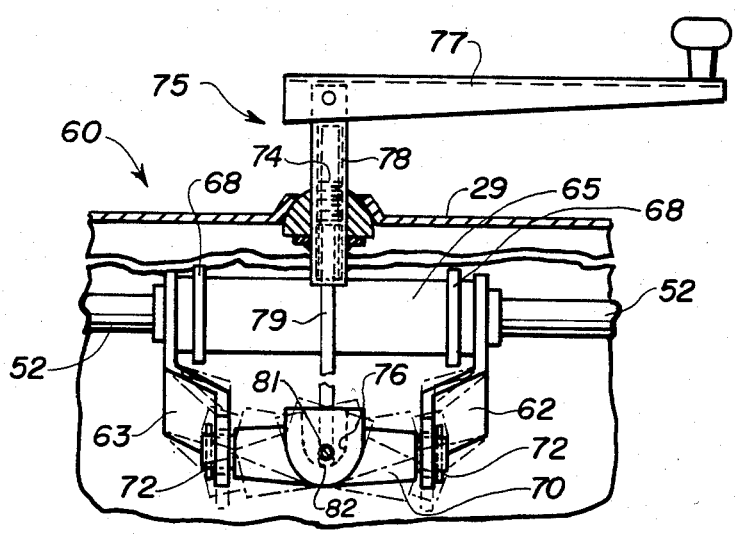
FIG. 4 is a detailed view of the biasing force equalization mechanism corresponding to lines 4—4 of FIG. 3, the pivotal movement of the trunnion and the movement of the arms being shown in phantom.

As can best be seen in FIGS. 3 and 4, the arms 62,63 are interconnected by a trunnion 70 received within oversized holes 72 formed in the arms 62,63 to permit a limited amount of pivotal movement of one arm 62 relative to the other arm 63, while still being interconnected by the trunnion 70. In this manner, as seen in phantom in FIG. 4, the arms 62,63 can move relative to one another in corresponding planes to accommodate variances in the manufacturing of the hexagonal ends 53,54 of the torsion bars 52, as will be described in further detail below.

To vary the biasing force exerted on the upper roll 32, an adjustment crank 75 is provided between the trunnion 70 and the top member 29 of the header 20. The adjustment member 75 includes a threaded rod-like member 79 pivotally connected to the trunnion 70 by a pin 81 to accommodate the permissible misalignment of the arms 62,63 and the resulting askewed relationship of the trunnion 70. The end 82 of the threaded rod 79 is rounded and set within a matching spherical socket 76 to facilitate the pivotal movement between the rod 79 and the trunnion 70 and to relieve some of the load exerted on the pin 81. The adjustment member 75 also includes a crank arm 77 fixed relative to the top member 29 of the header 20 and rotatably received therethrough and an internally threaded leg member 78. The threaded rod-like member 79 includes a head 74 threadably received within the downwardly depending leg 78 of the crank arm 77.

The construction of the leg member 78 is such that the enlarged head 74 cannot disengage from the leg 78, i.e. the head 74 will bottom out within the leg 78, and the range of movement of the head 74 within the leg 78 limits the scope of adjustment of the biasing force exerted on the upper roll 32 within acceptable levels of the torsion bars 52. Furthermore, the internal threading arrangement of the head 74 and the leg 78 protects the adjusting mechanism from crop residue, etc. As one skilled in the art will readily realize, a rotational manipulation of the crank arm 77 will affect a corresponding movement of the threaded member 79 to cause a simultaneous corresponding movement of both the left and right arms 62,63.

In operation, any misalignment of flats on the inboard and outboard hexagonal ends 53,54 of the torsion bars 52 may result in a corresponding misalignment of the left and right arms 62,63, and a resulting askewed position of the trunnion 70, as seen in phantom in FIG. 4, when the torsion bars 52 are in a no load condition, i.e., no windup of the torsion bars has been accomplished. The permissible pivotal movement of the trunnion 70 relative to the left and right arms 62,63 permits the equalization mechanism 60 to accommodate such manufacturing variances and, thereby, equalize the pressure exerted on the opposing transverse ends of the upper conditioning roll 32.

A manipulation of the crank arm 77 to threadably move the threaded member 79 affects a windup of the torsion bars 52 by rotating the inboard ends 53 within the tubular member 65 to exert a biasing pressure on the pivot arms 40, in a manner well known in the art. Since the biasing force equalization mechanism 60 has permitted an equalization of the pressure exerted by each torsion bar 52 on the opposing transverse ends of the upper roll 32 under the no load condition, the adjustment crank 75 will exert a simultaneous movement to the left and right arms 62,63 to continue an equal exertion of pressure to the ends of the upper roll 32.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific forms shown.

Having thus described the invention, what is claimed is:

1. In a hy harvesting machine having a mobile frame; crop conditioning means supported by said frame to condition crop received thereby, said crop conditioning means having first and second cooperable conditioning members, said first conditioning member being movable relative to said second conditioning member and being biased toward a position relative to said second conditioning member, said first member having first and second opposing ends; crop cutting and conveying means supported by said frame to sever standing crop material and convey the severed crop material to said crop conditioning means, biasing means for biasing said first member toward said position relative to said second conditioning member, said biasing means having first and second biasing member connected to said first and second ends, respectively, to effect a respective biasing of the opposing ends of said first conditioning member toward said position relative to said second conditioning member, the improvement comprising:

a biasing force equalization member having a first arm connected to said first biasing member, a second arm spaced from said first arm and connected to said second biasing member and a trunnion interconnecting said first and second members to permit a limited relative movement between said first and second arms in corresponding planes, allowing an equalizing of the biasing forces exerted by said biasing members on the respective opposing ends of the first conditioning member.

2. The hay harvesting machine of claim 1 wherein said first and second arms are movable in said corresponding planes to vary the biasing force exerted on the ends of said first conditioning member.

3. The hay harvesting machine of claim 2 wherein a pressure adjustment mechanism is connected to said trunnion to effect a selective simultaneous movement of said first and second arms to vary the biasing force exerted on said first conditioning member.

4. The hay harvesting machine of claim 3 wherein said trunnion is pivotally connected to said adjustment mechanism to accommodate the limited relative movement between said first and second members.

5. The hay harvesting machine of claim 4 wherein said trunnion is received within oversized holes in said first and second arms to permit said limited relative movement between said arms.

6. The hay harvesting machine of claim 4 wherein said first and second biasing members are torsion bars, the limited relative movement between said first and second members permitting an equal windup in said torsion bars.

7. The hay harvesting machine of claim 6 wherein each said torsion bar includes inboard and outboard ends, each said end having a hexagonal cross-sectional configuration.

8. The hay harvesting machine of claim 7 wherein said inboard ends of said torsion bars are connected to said equalization member, any misalignment of the flats on said hexagonal inboard and outbaord ends resulting in a corresponding misalignment of said first and second arms to equalize the pressure on the opposing ends of said first conditioning member.

9. The hay harvesting machine of claim 8 wherein said adjustment mechanism includes a crank member having an internally threaded leg, said adjustment mechanism further including a threaded member pivotally connected to said trunnion and threadably received within said crank member leg.

10. The hay harvesting machine of claim 9 wherein the simultaneous movement of said first and second arms varies the pressure on the opposing ends of said first conditioning member in an equal manner.

* * * * *